(12) United States Patent
Heintz et al.

(10) Patent No.: US 8,581,158 B2
(45) Date of Patent: Nov. 12, 2013

(54) ELECTRICALLY CONDUCTIVE COATING COMPOSITION

(75) Inventors: Amy M. Heintz, Dublin, OH (US); Anne-Claire Christiaen, Pataskala, OH (US); Bhima Rao Vijayendran, Kuala Lumpur (MY); Joel D. Elhard, Hilliard, OH (US); Ramanathan S. Lalgudi, Columbus, OH (US); Wayne B. Robbins, Columbus, OH (US); Abhishek Gupta, Charlotte, NC (US); Jeffrey Cafmeyer, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 1045 days.

(21) Appl. No.: 12/375,973

(22) PCT Filed: Aug. 1, 2007

(86) PCT No.: PCT/US2007/074963
§ 371 (c)(1),
(2), (4) Date: Nov. 2, 2009

(87) PCT Pub. No.: WO2008/085550
PCT Pub. Date: Jul. 17, 2008

(65) Prior Publication Data
US 2010/0126981 A1 May 27, 2010

Related U.S. Application Data

(60) Provisional application No. 60/835,007, filed on Aug. 2, 2006, provisional application No. 60/834,996, filed on Aug. 2, 2006.

(51) Int. Cl.
| *H05B 3/02* | (2006.01) |
| *H05B 3/10* | (2006.01) |
| *B23K 13/08* | (2006.01) |
| *B23K 15/02* | (2006.01) |
| *D01F 9/12* | (2006.01) |
| *G11B 11/105* | (2006.01) |
| *B32B 17/10* | (2006.01) |
| *B32B 9/00* | (2006.01) |
| *B32B 19/00* | (2006.01) |

(52) U.S. Cl.
USPC .......... 219/553; 219/482; 428/332; 428/339; 428/688; 977/847; 423/447.2

(58) Field of Classification Search
USPC .................. 219/482, 553; 428/332, 339, 688; 977/847; 423/447.2
See application file for complete search history.

(56) References Cited

U.S. PATENT DOCUMENTS

| 4,534,886 A | 8/1985 | Kraus et al. |
| 4,775,118 A | 10/1988 | Daniels |

(Continued)

FOREIGN PATENT DOCUMENTS

| CA | 2302007 | 4/1999 |
| DE | 10324377 A1 | 1/2005 |

(Continued)

OTHER PUBLICATIONS

Extended European Search Report relating to EP Application No. 11173126.1, dated Jul. 4, 2012.

(Continued)

*Primary Examiner* — J. H. Hur
(74) *Attorney, Agent, or Firm* — Dinsmore & Shohl LLP

(57) ABSTRACT

An electrically conductive coating composition is provided for use on aircraft and other substrate surfaces to prevent the formation of ice or to melt ice. The conductive coating composition may include a nanomaterial such as carbon nanotubes dispersed in a solvent which may be applied to a substrate surface to form a thin film which is resistively heatable. The conductive coating may also comprise a nanomaterial formed from carbon nanotubes or fullerenes grafted to a polymer containing an active functional group which renders a substrate surface icephobic and is also resistively heatable.

32 Claims, 4 Drawing Sheets

(56) References Cited

U.S. PATENT DOCUMENTS

| | | | |
|---|---|---|---|
| 5,187,015 | A | 2/1993 | Yorkgitis et al. |
| 5,344,696 | A | 9/1994 | Hastings et al. |
| 5,728,749 | A | 3/1998 | Vanhoye et al. |
| 5,934,617 | A | 8/1999 | Rutherford |
| 6,084,020 | A | 7/2000 | Smith et al. |
| 6,145,787 | A | 11/2000 | Rolls |
| 6,194,685 | B1 | 2/2001 | Rutherford |
| 6,279,856 | B1 | 8/2001 | Rutherford et al. |
| 6,599,446 | B1 * | 7/2003 | Todt et al. ............. 252/511 |
| 6,599,961 | B1 | 7/2003 | Pienkowski et al. |
| 6,689,835 | B2 | 2/2004 | Amarasekera et al. |
| 6,783,702 | B2 | 8/2004 | Niu et al. |
| 6,797,795 | B2 | 9/2004 | Byrd |
| 6,809,169 | B2 | 10/2004 | Byrd et al. |
| 6,830,710 | B2 | 12/2004 | Bonnet et al. |
| 6,919,394 | B2 | 7/2005 | Miyoshi et al. |
| 6,953,830 | B2 | 10/2005 | Chou |
| 6,969,504 | B2 | 11/2005 | Smalley et al. |
| 7,060,241 | B2 | 6/2006 | Glatkowski |
| 2004/0197546 | A1 | 10/2004 | Rinzler et al. |
| 2005/0035110 | A1 | 2/2005 | Petrenko |
| 2005/0067406 | A1 * | 3/2005 | Rajarajan et al. ........ 219/553 |
| 2005/0181195 | A1 | 8/2005 | Dubrow |
| 2006/0096967 | A1 | 5/2006 | Weiss |

FOREIGN PATENT DOCUMENTS

| | | |
|---|---|---|
| DE | 102004044352 A1 | 3/2006 |
| JP | 2000058228 A | 2/2000 |
| JP | 2005132919 | 10/2003 |
| JP | 2004026957 A1 | 1/2004 |
| JP | 2005072209 A1 | 3/2005 |
| WO | 0009446 | 2/2000 |
| WO | 02076724 A1 | 10/2002 |
| WO | 2005114324 A2 | 12/2005 |
| WO | 2005119772 A2 | 12/2005 |

OTHER PUBLICATIONS

Banerjee et al., "Covalent Surface Chemistry of Single-Wlaled Carbon Nanotubes", Advanced Materials, 17, No. 1, Jan. 6, 2005.

Laforte et al., "Icephobic Material Centrifuge Adhesion Test", IWAIS XI, Montreal, Jun. 2005.

Boal et al., "Self-assembly of nanoparticles into structured spherical and network aggregates", Macmillan Magazines, Ltd., Nature, vol. 404, Apr. 13, 2000.

Claes G. Granqvist, "Transparent conductors as solar energy materials: A panoramic review", ScienceDirect, Solar Energy materials & Solar Cells 91 (2007) 1529-1598.

Thermion Systems International, Inc., "Propellers/Fixed Wings Leading Edges/ Rotor Craft/Other Aircraft", Aerospace Industrial Heaters Material Joining, Copyright 2005.

Thermion Systems International, Inc., "About Thermion Systems International", Aerospace Industrial Heaters Materials Joining, Copyright 2005.

Electro Fiber Technologies, LLC "Electro Fiber Technologies offers Metal Coated Carbon Fiber for use in composite manufacturing, EMI/RFI shielding, and specialty materials applications", Sep. 20, 2004.

Battelle National Security Division, "Innovation: Icephobic Surfaces R&D Aims to Repel ice", Defense Innovations, Copyright 2005.

* cited by examiner

ELECTRICALLY CONDUCTIVE COATING COMPOSITION

The present invention relates to an electrically conductive coating composition for use in preventing the icing of and actively de-icing aircraft and other substrate surfaces, and more particularly, to a conductive coating composition which may be applied to a substrate surface to form a film which is resistively heatable.

In cold weather conditions, ice may build up on the surfaces of vehicles, aircraft, and other structures. The buildup of ice on the surfaces of aircraft during flight or while on the ground is of particular concern as ice may accumulate on airfoil surfaces, radomes, engine inlets, windshields, and the like, resulting in increased weight and drag, an increased demand on engines, and decreased lift. Even a small buildup of ice on the wings and other surfaces of the aircraft can adversely affect flight stability, thus impacting safety.

Current approaches for the removal of ice from commercial and military aircraft include the use of anti-icing techniques such as evaporation of water and/or water run-off, or the use of de-icing fluids such as ethylene and propylene glycol. Other known techniques utilize a combination of anti-icing and de-icing methods. However, many de-icing fluids currently in use have significant negative environmental impacts.

Another known method of ice removal includes the use of flexible pneumatic coverings, or "boots" on the leading edge surfaces of aircraft wings and control surfaces. Such boots are periodically provided with pulses of air or fluid to cause any ice accumulated on the surfaces to be cracked away and removed by action of the airstream over the surfaces.

Heating elements are also known in the art which are based on nickel-coated carbon fiber mats. For example, nickel-coated carbon fiber mats capable of being heated are currently applied to aircraft propellers, wings, and rotor blades to provide a means of in-flight de-icing. Such mats are typically applied by a lay-up process and then coated with a protective coating layer. However, while such mats provide effective heating, the lay-up process is time consuming and labor-intensive, and is not well suited for coating curvilinear surfaces, crevices, or angled surfaces. In addition, it is difficult to manufacture coated carbon fibers having uniform and isotropic fiber distribution which is required in order to achieve homogeneous heat distribution.

Conductive paints are also known which typically comprise copper or silver filled resins. However, such paints add weight due to the use of high density metal conductive fillers. In addition, such paints may also be subject to corrosion.

Accordingly, there is still a need in the art for a de-icing system for use on aircraft and other surfaces which is easy and cost-effective to produce, which can easily be applied to a variety of substrate surfaces, and which provides homogeneous heat distribution.

The present invention meets those needs by providing an electrically conductive coating composition which can be applied to the surfaces of aircraft and other substrates, and which forms a thin adherent film thereon. The film functions as a resistive heating element to melt ice present on the substrate surface and/or retard or prevent ice formation.

According to one aspect of the present invention, an electrically conductive coating composition is provided comprising a nanomaterial selected from carbon nanotubes, metal nanorods, functionalized metal nanoparticles, and a nanostructure comprising carbon nanotubes or fullerenes grafted to a polymer containing an active functional group. The conductive coating composition forms a film when applied to a substrate and is resistively heatable to prevent the formation of ice on, or to melt ice from, the surface of the substrate.

By "nanomaterial," it is meant a structure whose size is measured in nanometers. Such materials may include particles having at least one dimension which can be measured in nanometers (nanoparticles, nanorods) or nanotubes having two dimensions which can be measured in nanometers.

Where the nanomaterial comprises a nanostructure comprising carbon nanotubes or fullerenes grafted to a polymer containing an active functional group, the polymer is selected so as to render the surface of the substrate icephobic. By "icephobic," it is meant that the ability of ice to adhere to the substrate surface is reduced. The polymer preferably has hydrophobic properties and is selected from a fluoropolymer or a silicone. The polymer preferably has at least one active functional group selected from methylene, amine, amide, and carboxyl. In one embodiment, the polymer comprises polydimethyl siloxane.

The nanostructure preferably comprises from about 20 to about 99% by weight of the polymer and from about 0.02 to about 50 wt % of the carbon nanotubes or fullerenes. More preferably, the nanostructure comprises from about 0.5 wt % to about 5 wt % of the carbon nanotubes or fullerenes. In this embodiment, the coating composition forms a film having a sheet resistance of between about 10 and 1000 ohms/square, and more preferably, between about 10 and 400 ohms/square.

Where the nanomaterial comprises carbon nanotubes, the carbon nanotubes are preferably selected from single-walled carbon nanotubes, double-walled carbon nanotubes, multi-walled carbon nanotubes, and mixtures thereof.

In one embodiment of the invention, the electrically conductive coating composition further includes a liquid carrier which facilitates the application of the composition to a substrate surface. The liquid carrier preferably comprises a solvent which is selected from alcohols, ethers, esters, ketones, water, halogenated solvents, aromatic solvents, or mixtures thereof. In one embodiment, the solvent comprises an alcohol selected from isopropanol and ethanol. The conductive coating composition may comprise from about 0.001 to about 5 wt % of the nanomaterial and from about 85 to about 99 wt % of the solvent.

In another embodiment of the invention, a substrate having a resistively heatable film thereon is provided, which film comprises an electrically conductive coating composition comprising a nanomaterial selected from carbon nanotubes, metal nanorods, and functionalized metal nanoparticles, and where the film has a sheet resistance of from about 0.01 to about 1000 ohm/sq. Preferably, the film has a thickness of from about 0.05 µm to about 1,000 µm, and more preferably between about 1 to about 25 µm. The substrate having the film thereon is preferably selected from metal, glass, polymers, elastomers, ceramics, aluminum composites, and carbon fiber composites.

In this embodiment, the substrate may further include a primer coating on the substrate, where the resistively heatable film overlies the primer coating. The primer coating preferably comprises an epoxy-based or polyurethane-based coating and functions to provide better bonding between the coating composition and substrate. The primer coating may also be used to prevent corrosion of the substrate, for example, through the addition of corrosion inhibitors commonly known in the art, such as chromate.

The substrate may further include a top coating which overlies the resistively heatable film. The top coating may comprise a polyurethane, epoxy, polycarbonate, or siloxane based coating. In one embodiment, the top coating includes a thermally conductive filler therein such that the top coating is thermally conductive.

Alternatively, the substrate may include a thermally conductive top coating comprising a nanostructure comprising carbon nanotubes or fullerenes grafted to a polymer containing at least one active functional group.

The substrate may further include a thermal barrier coating thereon. The barrier coating preferably comprises a ceramic coating. In one embodiment, the barrier coating comprises yttria stabilized zirconia.

The resistively heatable film preferably further includes at least two conductive leads embedded therein for applying a current to the film.

In another embodiment of the invention, a substrate having a multilayer coating thereon is provided which is resistively heatable to prevent the formation of ice or to melt ice on the surface of the substrate. The substrate comprises a base substrate having first and second major surfaces; a primer coating layer on the first major surface of the substrate; an electrically conductive film layer on the primer coating, where the electrically conductive film layer is formed from a nanomaterial selected from carbon nanotubes, metal nanorods, and functionalized metal nanoparticles; and a thermally conductive topcoat on the conductive film layer. The thermally conductive topcoat preferably comprises a coating composition comprising a nanostructure comprising carbon nanotubes or fullerenes grafted to a polymer containing an active functional group, where the polymer has hydrophobic properties.

The substrate may further include a thermal barrier layer between the primer layer and the conductive film layer to prevent potential heat loss where the conductive film is used in deicing applications.

In yet another embodiment of the invention, a substrate having an electrically conductive coating composition thereon is provided which is resistively heatable to prevent the formation of ice or to melt ice on the surface of the substrate. The coating composition comprises a nanostructure comprising carbon nanotubes or fullerenes grafted to a polymer containing an active functional group; wherein the polymer is selected such that water droplets applied to the surface of the coating composition exhibit a contact angle on the substrate of at least 80 degrees. The polymer preferably exhibits hydrophobic properties and contains at least one active methylene group. The polymer preferably comprises polydimethyl siloxane. Preferably, water droplets applied to the surface of the coating composition exhibit a contact angle of at least 100 degrees.

The present invention also provides a method of preventing the formation of ice on, or melting ice from, the surface of a substrate comprising applying an electrically conductive coating composition to a substrate surface to form a film thereon, the coating composition comprising a nanomaterial selected from carbon nanotubes, metal nanorods, functionalized metal nanoparticles; and resistively heating the conductive coating composition. The coating composition may further include a liquid carrier.

The coating is preferably resistively heated by applying voltage to the film between about 5 and about 240 V. The method may further include heating the film to a temperature of between about 20° C. and about 400° C.

In an alternative method of preventing the formation of ice on, or melting ice from, the surface of a substrate, the method comprises applying an electrically conductive coating composition comprising a nanomaterial selected from carbon nanotubes, metal nanorods, functionalized metal nanoparticles, and optionally, a polymer, to a substrate surface; and resistively heating the conductive coating composition. In this embodiment, the method may include heating the film to a temperature of between about 40° C. and about 180° C.

Accordingly, it is a feature of the present invention to provide an electrically conductive coating composition for application to the surfaces of aircraft and other substrates and which forms an adherent film thereon which can be heated to melt ice from a surface or prevent ice formation on a surface. This, and other features and advantages of the present invention will become apparent from the following detailed description and the appended claims.

Figure 1:
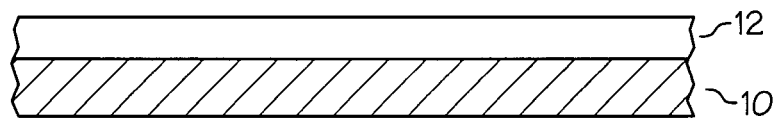
FIG. 1 is a cross-sectional view illustrate one embodiment of the electrically conductive coating of the present invention on a substrate.

The conductive coating composition described herein may be used on aircraft surfaces such as wings, airfoils, radomes, engine inlets, and the like, and other substrate surfaces to melt ice present on the surface and/or prevent the further build-up of ice. The conductive coating composition may also be used for sterilization of surfaces, such as, for example, in food service or medical applications. The coating utilizes electrically conductive nanomaterials which may be dispersed in a liquid carrier and which, upon drying to a film, provide homogeneous heat distribution. Because the coating contains nanomaterials which are electrically conductive, when voltage is applied to the coating, resistive heating is generated which aids in removing ice from or which prevents ice buildup on a substrate surface.

In embodiments where the coating composition includes a nanomaterial and a solvent, the coating composition of the present invention forms a film without the need for adding any polymer to the composition, i.e., the nanomaterial and solvent are "self film-forming." This is believed to be due to the use of nanomaterials such as nanotubes which coalesce into bundles upon evaporation of the solvent. These bundles form continuous, uniform network structures which exhibit high conductivity, high flexibility, and good durability when coated on a substrate surface. However, it should be appreciated that while it is not necessary to include a polymer in this embodiment of the coating composition, a polymer may optionally be included. For example, the coating composition may contain any of the polymers having icephobic properties as described herein.

In embodiments where the nanomaterial comprises a nanostructure comprising carbon nanotubes or fullerenes grafted to a polymer, an "icephobic" coating is provided which prevents the formation and build-up of ice on a substrate. Icephobicity can be measured by tests that measure ice adhesion, such as centrifuge ice adhesion testing. In a centrifuge ice adhesion test, a coated sample bar is placed in the centrifuge with an ice coupon on one side of the bar and a counter balance on the other. The bar is subjected to centrifugal force and the centrifugal force required to detach the ice is determined and compared to the force required to detach ice from bare substrates. The adhesion reduction factor is the ratio of the shear stress for bare substrates over the adhesion stress for coated substrates. See C. Lafort and A. Beissenger, "Ice Material Centrifuge Adhesion Test," *IWAIS XI, Montréal, June* 2005. The ice adhesion factor for the icephobic coating composition of the present invention is preferably greater than 1, and more preferably, greater than 12.

In addition, because the coating contains nanomaterials which are electrically conductive, electrical current may be applied to the coating to generate resistive heating which further aids in preventing ice formation or in removing ice from a substrate surface. Melting the ice at the interface between the coating and the ice creates a weak boundary layer, and the high hydrophobicity of the coating allows shedding of the wet ice.

Preferred polymers for use in the icephobic embodiment of the electrically conductive coating composition include polymers exhibiting hydrophobic properties and which contain at least one active functional group capable of undergoing a [2+1] cycloaddition reaction. Suitable hydrophobic polymers include fluoropolymers such as those derived from perfluoroalkyl methacrylates and an acrylate co-monomer with at least one active methylene group. A preferred hydrophobic polymer is polydimethyl siloxane derived from acrylate-terminated polydimethylsiloxane and an acrylate co-monomer with at least one active methylene group. While methylene is a preferred active functional group, other suitable functional groups include amine, amide, and carboxyl groups.

Suitable monomers and oligomers for hydrophobic polymer formation include, but are not limited to, 2-(perfluoroalkyl)ethyl methacrylate (Zonyl™ commercially available from DuPont), 1,1,1,3,3,3-hexafluoroisopropyl acrylate, 2,2,2-trifluoroethyl acrylate, 2,2,3,3,3-pentafluoroisopropyl acrylate, 2,2,3,3,4,4,4-heptafluorobutyl acrylate, 2,2,3,3,4,4,5,5,6,6,7,7,8,8,9,9,10,10,11,11-eicosafluoroundecyl acrylate, 2,2,3,3,4,4,5,5,6,6,7,7,8,8,9,9,-hexadecafluoronyl acrylate, 2,2,3,3,4,4,5,5,6,6,7,7-dodecafluoroheptyl acrylate, 2,2,3,3,4,4,5,5-octafluoropentyl acrylate, 2,2,3,3-tetrafluoropropyl acrylate, 2,2,3,4,4,4-hexafluorobutyl acrylate, 1,1,1,3,3,3-hexafluoroisopropyl methacrylate, 2,2,2-trifluoroethyl methacrylate, 2,2,3,3,3-pentafluoropropyl methacrylate, 2,2,3,3,4,4,4-heptafluorobutyl methacrylate, 2,2,3,3,4,4,5,5-octafluoropentyl methacrylate, 2,2,3,3-tetrafluoropropyl methacrylate, acrylate or methacrylate-terminated Polyhedral Oligomeric Silsesquioxane (POSS), styryl-terminated POSS, poly(dimethylsiloxane-co-diphenylsiloxane) (divinyl terminated), and poly(dimethylsiloxane) (vinyl terminated).

Preferred co-monomers containing an active methylene group include, but are not limited to, 2-(methacryloyloxy)ethyl acetoacetate and mono-2-(methacryloyloxy)ethyl maleate.

Suitable non-fluorinated monomers such as acrylic monomers, vinyl ester monomers, or styrene monomers can also be used as co-monomers in the polymerization process described herein. They may be used alone or in combination with other non-fluorinated acrylic monomers. Example of suitable non-fluorinated acrylic monomers include ethylenically unsaturated polymerizable $C_1$-$C_8$ alkyl esters of acrylic and methacrylic acid include methylacrylate, ethylacrylate, butylacrylate, 2-ethyl-hexyl acrylate and the corresponding methacrylates.

Examples of vinyl ester monomers include, but are not limited to, vinyl acetate, vinyl propionate, vinyl pivalate, vinyl laurate, vinyl 2-ethyl hexanoate, dibutyl maleate, dioctyl maleate, diisopropyl maleate, diisopropyl fumarate, versatic acid vinyl esters having 9 to 12 carbon atoms, and preferably 9 to 10 carbon atoms, or mixtures thereof.

Examples of styrenic monomers include, but are not limited to, styrene, alpha-methyl styrene, and 4-chlorobenzyl styrene.

The above monomers and co-monomers may be polymerized to form the hydrophobic polymer using either random copolymerization and/or block copolymerization using free radical solution or emulsion polymerization techniques known to those skilled in the art. The resulting hydrophobic polymer is preferably included in the coating in an amount of from about 20 to about 99% by weight.

Preferred nanomaterials for use in the icephobic conductive coating composition include single-walled or multi-walled carbon nanotubes, including double-walled and few-walled varieties, and fullerenes. Single-walled and multi-walled carbon nanotubes are preferred for use in the present invention as they exhibit high conductivity due to their graphitic carbon structure and nanoscale size. In addition, they have a high aspect ratio (about 1,000:1) such that they form an effective electrically conductive network when combined with non-conductive materials such as hydrophobic polymers. The amount of nanomaterials in the coating may vary from between about 0.02 wt % to about 50 wt % of the carbon nanotubes or fullerenes. More preferably, the nanostructure comprises from about 0.5 wt % to about 5 wt %.

A preferred icephobic conductive coating composition for use in the present invention includes 96 wt % Zonyl™ glycidyl acrylate and 4 wt % multi-walled nanotubes. When water drops are applied to the surface of this composition, the drops exhibit a contact angle of about 117°. The composition has a sheet resistance of 400 ohms/square.

The grafting reaction of the hydrophobic polymer and nanomaterial is preferably achieved by using a modified Bingel reaction (cyclopropenation reaction) of the nanomaterials with the hydrophobic polymer.

Alternatively, grafting may be achieved by free radical polymerization of monomers in the presence of carbon nanotubes and one or more initiators such that the free radicals generated by the initiator promote grafting of the monomers and grow polymer chains onto the carbon nanotube surface.

The icephobic conductive coating composition may be applied to a substrate using a number of different methods including spraying, brushing, dipping, roller coating, e-spraying, and any other suitable coating method which achieves a suitable thickness.

Once the icephobic coating has been applied to a substrate surface, liquids on the surface of the composition preferably exhibit a contact angle on the substrate of at least 80°. More preferably, liquids on the surface of the composition exhibit a contact angle of at least 100°. Most preferably, liquids on the surface of the composition exhibit a contact angle of greater than 125°.

Because the coating composition is electrically conductive due to the presence of the carbon-based nanomaterials, once coated onto a substrate surface, the coating can be heated by passing electrical current through the coating such that the resulting resistive heating melts ice present on the substrate surface and/or retards ice formation. Typically, electrical current may be applied to a coated substrate surface by coating two contact points on the substrate surface with conducting silver epoxy and connecting the points to a constant current power supply, using, for example, alligator clips. The coating may be heated to a temperature of between about 40° C. to about 180° C. It should be appreciated that the temperature should not exceed the melting point of the polymer in the coating to avoid decomposition of the polymer.

The coating exhibits a sheet resistance up to 400 ohms/sq., preferably between about 10 to 1000 ohms/sq., and more preferably, between about 10 and 400 ohms/sq.

Referring now to FIG. 1, a substrate 10 is shown including an electrically conductive coating 12 which comprises the icephobic coating formed from a nanomaterial grafted to a hydrophobic polymer. This icephobic embodiment of the electrically conductive coating composition reduces or prevents ice formation by two mechanisms. First, because the polymer component of the coating is highly hydrophobic, it reduces wetting of a substrate surface by virtue of the high contact angle between the surface and any water droplets. In addition, where ice formation occurs, the surface interface can be heated by passing current through the coating to melt the ice, enhancing its removal from the substrate surface. Suitable substrates 10 onto which the conductive coating may be applied include metals such as aluminum and steel, glass, ceramics, carbon fiber composites, polymer composites, thermoplastic and thermosetting polymers, and elastomers.

Figure 2:
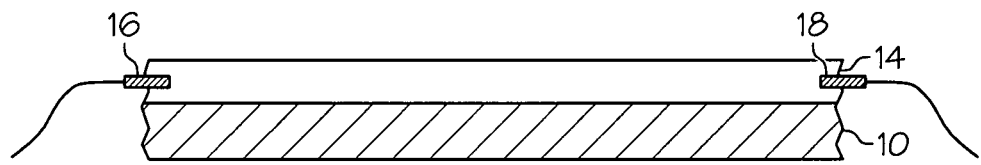
FIG. 2 is a cross-sectional view illustrating another embodiment of the electrically conductive coating.

Referring now to FIG. 2, another embodiment of the electrically conductive coating composition is shown in which the coating has been formed from a nanomaterial and a liquid carrier such as a solvent which solvent evaporates to forms a film 14 on substrate 10. Suitable nanomaterials for use in this embodiment of the coating composition include single-walled or multi-walled carbon nanotubes, including double-walled and few-walled varieties, metal nanorods, and functionalized metal nanoparticles. Single-walled and multi-walled carbon nanotubes are preferred for use in the present invention as they exhibit high conductivity due to their graphitic carbon structure and nanoscale size, they exhibit high thermal stability, are non-corrosive, light-weight, and are readily dispersed in solvents.

Typically, in order to achieve high flexibility and continuous nanotube network structure, nanomaterials having aspect ratios greater than 200 are required. However, it is believed that by attaching specific functional groups to nanomaterials such as conductive metal nanoparticles, upon drying, the nanoparticles become bound together. These nanoparticles may become bound together by self-assembly or by the use of external catalysts that initiate polymerization or condensation of grafted functional groups. Self-assembly approaches are known in the art; for example Boal et al. have demonstrated the self-assembly of colloidal gold nanoparticles (2 nm) through a hydrogen bonding interaction. Boal, A. K.; Ilhan, F.; DeRouchey, J. E.; Thurn-Albrecht, T.; Russell, T. P.; Rotello, V. M. *Nature* (London) 2000, 404, pp. 746-748.

Metal nanoparticles may be functionalized with monomers that undergo condensation or polymerization including, but not limited to, acrylates, vinyl esters, styrene, vinyl ethers, methacrylates, oxazolines, N-vinyl carbazoles, and N-vinylpyrrolidones including, but not limited to, esters, dichlorosilanes, 2,6disubstituted phenols, and isocyanates. Appropriate initiators or catalysts must be used to facilitate the reaction which may include photocatalysts, radical initiators, acids, bases, oxygen, and water. The monomer may be linked to the metal nanoparticle through covalent or non-covalent interaction between the monomer and the metal. The hardness scale may be used to determine the appropriate functional group for linking a metal to a monomer. Noble metals such as gold, silver, and copper are soft and interact strongly with thiols, phosphines, amines, and thiocyanates. Chelating ligands, ambidentate ligands, and monodentate ligands such as acetylacetonato-, 2,2-bipyridine, carbinol, cyano, diethylenetriamine, ethylenediamine, diethylenediaminetetraacetato, glycinato, hydroxo, maleonitriledithiolato, nitrilotriacetato, oxalate, tetraazacyclotetradecane, thiocyanato, and isothiocyanoto may be used to link monomer with metals. Other pi-systems may also be used. The linking group should be covalently attached to the monomer in a way that does not prevent reaction by polymerization or condensation. By way of example, one such monomer is thioethylmethacrylate.

Depending on the type of substrate used, the adhesion between the substrate and coating may be improved by incorporation of appropriate functional groups on the nanomaterial. Suitable functional groups include carboxyl, alcohols, thiols, amines, and sulfonyl. Such groups may be attached to the ends or sidewalls of the nanomaterials. For example, carbon nanotubes can be functionalized at defects, ends, or sidewalls by reactions known in the art, such as oxidation with nitric acid, potassium permanganate, oxygen gas, osmium tetraoxide, or potassium chromate; by reductive alkylation; fluorination; nitrene cycloaddition; Bingel's reaction; diels Alder; 1,3-dipolar cycloaddition; diazotization; dichlorocarbene addition; radical addition; hydrogenation, ozonation; or nucleophilic addition. See, for example, S. Banerjee, T. Hemray-Benny and S. S. Wong, *Advanced Materials* 2005, p. 17.

In this embodiment, the conductive coating composition is preferably formed by solution processing methods. The nanomaterials are dispersed in a liquid carrier or dispersing agent which preferably comprises a solvent. Suitable solvents include alcohols such as isopropanol or ethanol, acetone, methyl ethyl ketone, butyl acetate, water, halogenated solvents, ethers, esters, and aromatic-containing solvents. Alcohols and water are preferred due to their low VOC content. The coating composition may comprise from about 0.001 to about 5 wt % of the nanomaterial and from about 85 to about 99 wt % of the solvent. The coating may also include optional additives to improve the properties or shelf life of the resulting film, for example, coalescing aids such as dimethylformamide, fungicides, dispersing agents, and biocides.

The conductive coating composition may be applied to a substrate using a number of different methods including spraying, brushing, and roller coating, or any other suitable coating method which achieves a desired film thickness of about 0.05 μm to about 1,000 μm, and homogeneous heat distribution. It should be appreciated that the resistance can be further decreased if additional coating is applied.

Once coated onto a substrate surface, the solvent in the coating evaporates and the coating self-forms into a continuous thin film.

As further shown in FIG. 2, at least two conductive leads 16 and 18 are embedded into or applied to the surface of the film to allow voltage to be applied to the film. The leads may be comprised of any conductor including metal foils, metal wires, conductive paints such as silver-filled epoxy, or other conductive materials. The lead aspect ratio for the lead geometry preferably ranges from between about 0.1 to about 10, and more preferably from about 1 to 10. By "lead aspect ratio," we mean the width between the leads compared to the width of the conductive film.

When voltage is applied to the dried film, the film is heated by resistive heating to a temperature sufficient to melt any ice present on the substrate surface. For example, when voltage is applied between about 5 and about 240 V, the film is heated to a temperature of between about 20° C. and about 400° C. It should be appreciated that the temperature needed to heat the film may vary, depending on the temperature of the underlying substrate.

The coating preferably exhibits a sheet resistance ranging from about 0.01 to about 1000 ohms/sq., and more preferably, from about 0.01 to about 100 ohms/sq.

It should be appreciated that in embodiments where the coating is formed from a nanomaterial and a liquid carrier, the resulting coating/film exhibits thermal stability, i.e., there is no degradation of the coating or change in performance at temperatures of greater than 400° C. in air.

Prior to application of the electrically conductive coating, a primer may be applied to the substrate to enhance adhesion of the coating to the substrate and optionally, to prevent corrosion of the substrate. Suitable primers include, but are not limited to, water-borne epoxy primers, solvent-borne high solids epoxy primers, water reducible epoxy primers, polyurethane primers, epoxy polyamine primers, and polycarbonate-based primers. Examples of suitable primers include Akzo Nobel Polyamide Epoxy (chromated) 10P8-11; Mankiewicz MC-200, or PPG NCP280 and NCX285.

In applications where the coating is applied to an aircraft surface for deicing applications, in order to prevent heat loss (e.g., through conduction or radiation), it may be desirable to add an optional thermal barrier coating between the primer and the conductive film layer or between the primer and the aircraft surface. The thermal barrier coating may comprise any material which has a low thermal conductivity, i.e., less than about 0.19 W/m·K, which exhibits stability in the desired temperature range, and which has suitable mechanical and adhesion properties for use with adjacent layers in a multilayer coating structure.

Preferred barrier coatings include inorganic ceramic materials as they have low thermal conductivities, high heat resistance, and may also be effective heat reflectors, i.e., they prevent radiative heat loss. Examples of suitable barrier coatings include zirconia and alumina-based ceramics, such as zirconia-filled epoxy, alumina-filled epoxy, yttria stabilized zirconia, and tungsten selenide. An example of a suitable barrier coating is Inframat SPS Thermal Barrier Nanocoating. Another suitable barrier coating which reduces both conductive and radiative heat loss is Thermohold CF, available from Zircotec.

Thermal barrier coatings may also formed from polymeric composites. For example, the addition of ceramic fillers to polymers, including primers, can lower the thermal conductivity.

The barrier coatings may be applied by high temperature processes such as thermal spraying. For application to carbon fiber composites or primer-coated substrates, the ceramic coating may be applied while wet and then cured at about 300° F.

A topcoat may also be included over the electrically conductive film to provide durability to the film. Preferred top coats include polyurethane, waterborne catalyzed polyurethane, chemically cured polyurethane, solvent-based epoxies, polycarbonate, and siloxane. Examples of suitable coatings include PRC Polyurethane 8800 series, Deft Inc. M85285+36176 and M85285+36375.

In one embodiment, the topcoat may be thermally conductive to facilitate heat transfer to the surface. Preferred thermally conductive topcoats are those exhibiting high thermal conductivity. Preferred coatings comprise polyurethane, polycarbonate, siloxane, or epoxy resins which include a thermally conductive filler therein to increase thermal conductivity. Suitable fillers include carbon fillers such as carbon fibers, carbon powder, or carbon nanotubes; metallic fillers such as copper powder, steel, aluminum powder, or aluminum flakes; and ceramic fillers such as boron nitride, aluminum nitride, and aluminum oxide. Examples of suitable thermally conductive top coatings include Elastochem EP401/501, available from Elastochem Specialty Chemicals and Master Bond two-component and one-component epoxies such as EP21TDCAOHT, EP21TDANHT, EP30AN, or EP3RR-1.

Alternatively, the thermally conductive topcoat may comprise the icephobic coating composition comprising carbon nanotubes or fullerenes grafted to a polymer containing an active functional group as described above.

Figure 3:
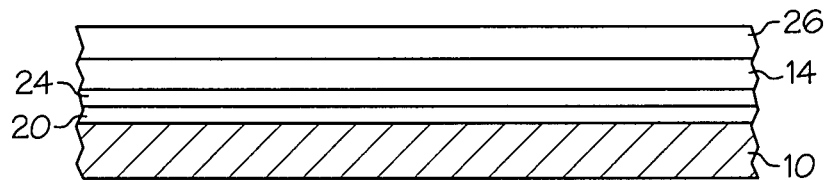
FIG. 3 is a cross-sectional view illustrating another embodiment of the electrically conductive coating.

FIG. 3 illustrates a substrate 10 including a multi-layer coating thereon as described above which includes primer coating 20, optional barrier coating 24, electrically conductive coating film 14, and a thermally conductive top coat 26.

The embodiments of the electrically conductive coating compositions described herein demonstrate durability, good substrate adhesion, and a reduction of ice adhesion to substrates.

In order that the invention may be more readily understood, reference is made to the following examples which are intended to illustrate the invention, but not limit the scope thereof.

EXAMPLE 1

A coating was formed in accordance with the present invention by dispersing single-walled carbon nanotubes (HiPco from Carbon Nanotechnologies Inc.) in dichlorobenzene. The resulting coating was applied by spraying onto glass slides. The sheet resistance of this sample as determined by 4-point probe measurements was 15 ohms/square. The performance of this coating (sample 1) as a resistive heater was tested and compared to that obtained with a free-standing single walled carbon nanotube film (sample 2) and a nickel-coated carbon fiber mat (sample 3) (available from Thermion).

The single-walled carbon nanotube free standing film was prepared by passing a 100 ppm dispersion of single-walled carbon nanotubes (HiPco SWNT from Carbon Nanotechnologies, Inc.) in aqueous sodium dodecylbenzene sulfonate (0.62 wt %) solution through a 50 micron Anodisc membrane filter.

After washing and drying, the nanotube film was released and dried.

Resistive heating was achieved by passing a direct electrical current through each sample to generate heat from electrical resistance. Probes (copper wires attached to the samples with silver paint) were attached to each sample at an equidistance from the sample center line. Probes attached to the samples were connected to a potentiostat to pass current through the samples with a maximum output of 10 V. The potentiostat was used in the galvenostat mode to pass constant current through each sample. The changes in voltage over time were recorded for constant currents. Sample temperature was recorded by an IR thermometer placed one inch above the center of the sample surface.

Figure 4:
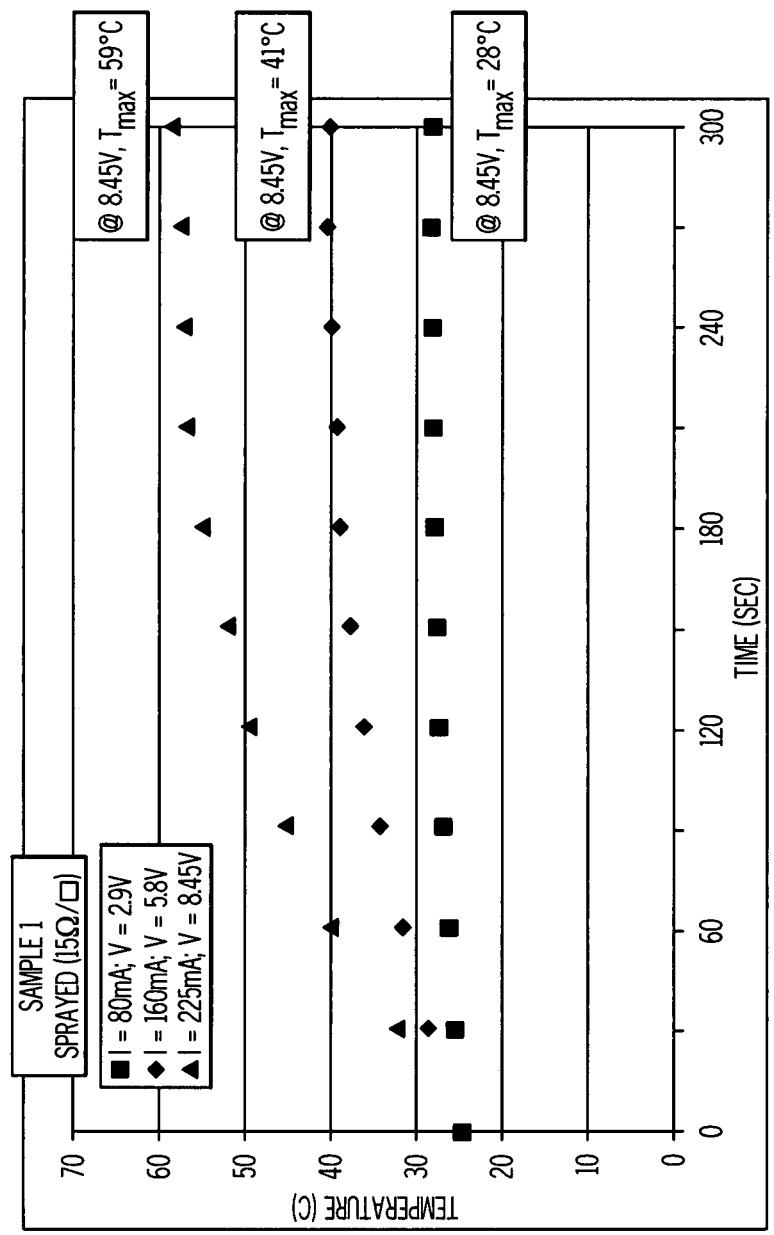
FIG. 4 is a graph illustrating resistive heating temperatures for the film of the present invention.
Figure 5:
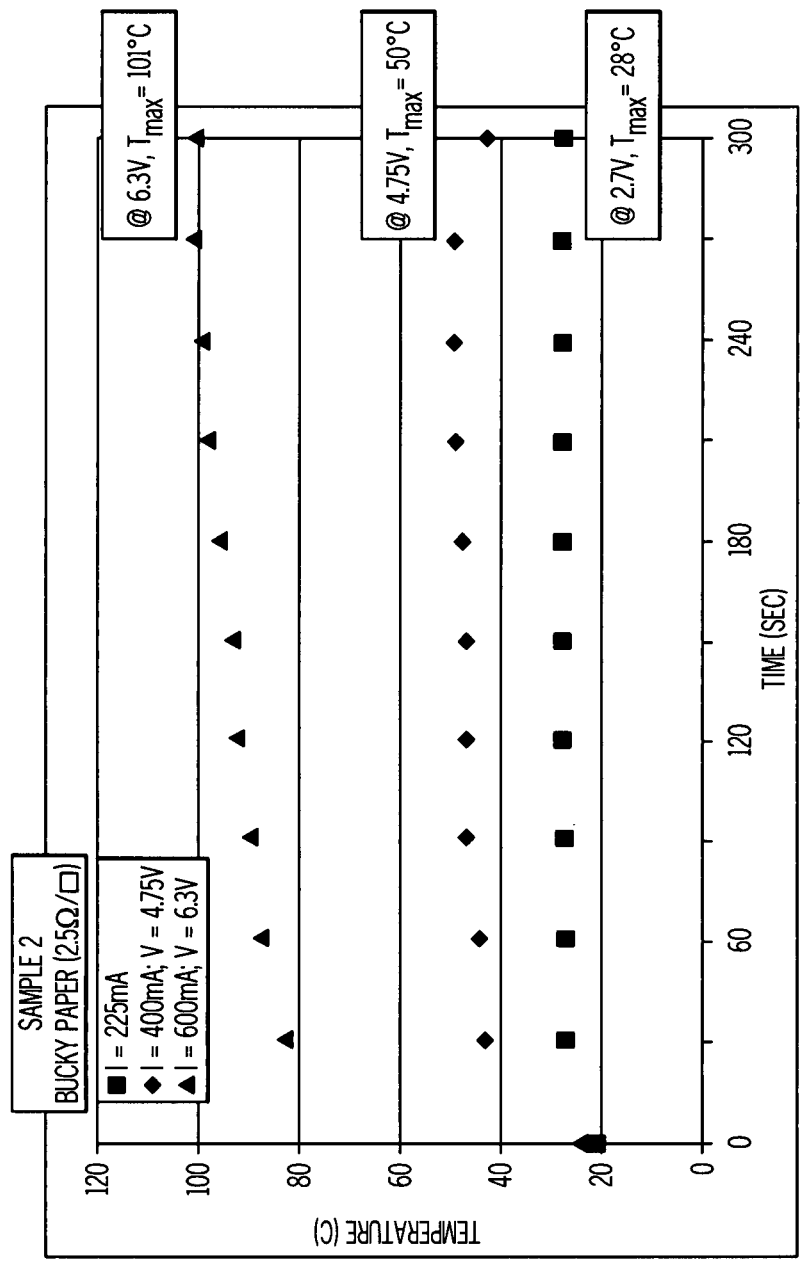
FIG. 5 is a graph illustrating resistive heating temperatures for the film of the present invention.
Figure 6:
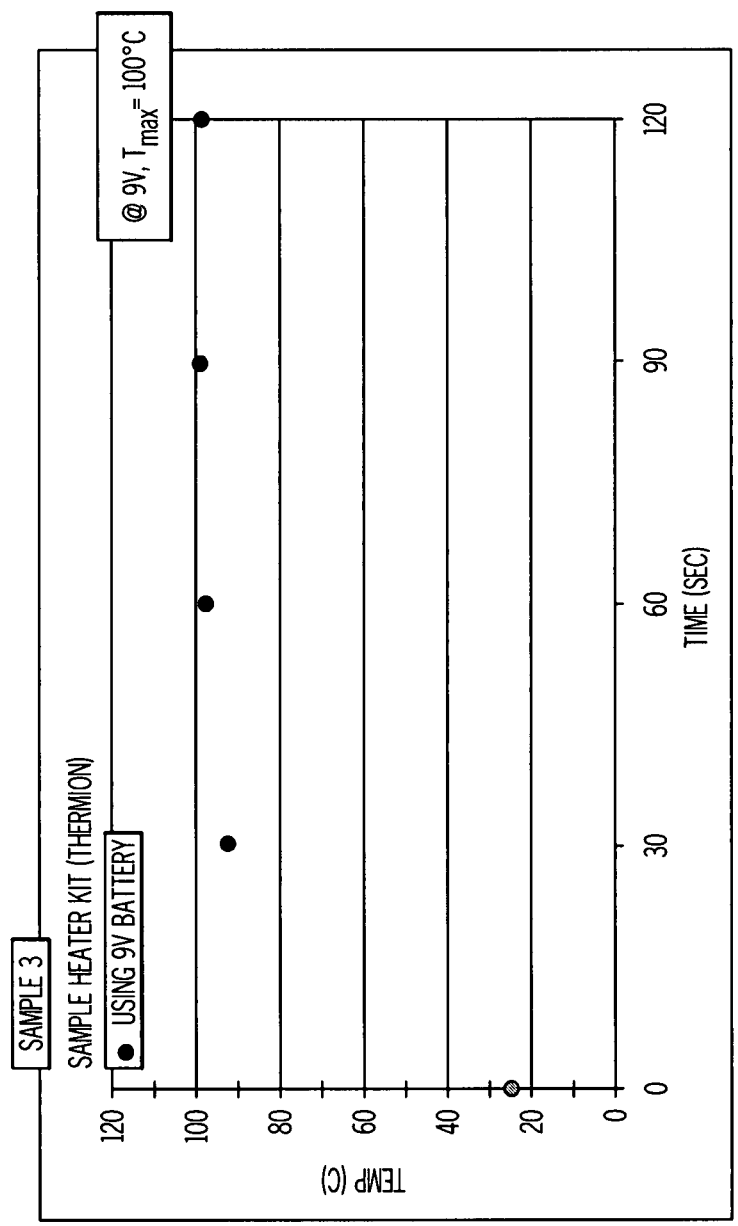
FIG. 6 is a graph illustrating resistive heating temperatures for the film of the present invention.

FIGS. 4-6 illustrate the resistive heating results for each of the samples with the application of varying current levels. As can be seen, the conductive coating of this embodiment of the present invention can be heated using resistive heating at temperatures sufficient to melt ice.

EXAMPLE 2

Oxidation of Multiwall Carbon Nanotubes

In a 35 mL microwave reactor tube equipped with a magnetic stir bar, 0.10 g of multi-walled carbon nanotubes (MWNT) (CVD MWNTs <10 nm from Helix Material Solutions), 7.5 mL of sulfuric acid, and 2.5 mL of nitric acid were charged. The reaction vessel was sealed and reacted under microwave irradiation at 130° C. for 5 minutes. The oxidized MWNTs were isolated by passing the reaction mixture through a 0.1 micron PVDF membrane filter and washing with water until the supernatant was pH=5. The sample was dried.

Preparation of Coating

A dispersion of 500 mg/L oxidized MWNTs in isopropanol was prepared by sonicating the mixture with a tiphorn for 5 minutes.

Preparation of Coated Samples

Aluminum (2024-T3 bare, 0.32 inch) was scuff sanded, solvent wiped to clean, and then primed with yellow epoxy (Deft 02-0Y-40A) according to MIL PRF 23377H. The resistive heating coating was applied to the primed substrates by spraying until the resistance of the dried film was 50 ohms/square.

Testing of Coated Samples

Leads were applied to the samples using silver adhesive. Two different lead geometries were investigated. In sample 4, the distance between leads was 3.4 cm and the sample width was 2.5 cm. In sample 5, the distance between leads was 2.0 cm and the sample width was 2.5 cm.

Probes attached to the samples were connected to a potentiostat to pass current through the samples with a maximum output of 10 V. For voltage greater than 10 V, samples were connected to a power supply with a maximum output of 20 V. Sample temperature was recorded by an IR thermometer placed one inch above the center of the sample surface. The results are shown in Table 1.

TABLE 1

| Lead Aspect Ratio | Voltage | Temperature (° C.) after 90 sec |
|---|---|---|
| 1.33 | 10 | 40.2 |
| 0.79 | 10 | 50.3 |
| 0.79 | 15 | 105.3 |
| 0.79 | 20 | 190.7 |

As can be seen, the geometry of the leads is important in optimizing the resistive heating capability of the sample. The best results are obtained if the lead aspect ratio, defined as the distance between the leads compared to the width of the sample, is less than 1.

EXAMPLE 3

Aluminum (2024-T3 bare, 0.32 inch) was scuff sanded, solvent wiped to clean, and then primed with yellow epoxy (Deft 02-0Y-40A) according to MIL PRF 23377H. A dispersion of MWNTs (<10 nm, Helix) in isopropanol was applied to the primed substrates by spraying. Leads were then applied to the substrates using silver adhesive so that the aspect ratio was 0.79. The corner of the leads was masked with tape and then DEFT topcoat (MIL PRF-85285D, Type 1, Class H) Color #36375 was applied (sample 6).

Cross hatch adhesion testing of sample 6 per ASTM D3359 "Standard Test Methods for Measuring Adhesion by Tape Test" showed that the CNTs had good adhesion with the primer and topcoat. The results of cross hatch adhesion testing had a rating of 4B to substrate, which means that an area of less than 5% of the coating was removed. The coating failure occurred between the primer and the substrate.

EXAMPLE 4

Synthesis of Hydrophobic Polymer Having at Least One Active Methylene Group

In a 250 ml three-neck polymerization vessel equipped with a magnetic stir assembly, a condenser, and an inert gas inlet and outlet adaptor, 25.06 g. of Zonyl™ monomer (DuPont), 5.12 g. of 2-methacryloloxy ethyl acetoacetate (Aldrich), 0.261 g. of 2,2'-azobisisobutyronitrile (Aldrich) and 250 ml butan-2-one (Aldrich) were charged. The reactants were stirred well and polymerization was carried out at 60° C. for 12 hours in an argon atmosphere. The product was cooled to room temperature at the end of polymerization.

EXAMPLE 5

50 g. of the hydrophobic polymer solution produced in Example 1 was weighed in a 250 ml 2-neck RBF equipped with a magnetic stir assembly, condenser, and an inert gas inlet and outlet adaptor. 100.8 mg of single-walled carbon nanotubes and 1.92 g. $CBr_4$ were added to the reaction flask and agitated at room temperature followed by very slow addition of 1.76 g. of 1,8-diazobicyclo[5,4,0]undec-7-ene (DBU, Air Products) over a period of 30 minutes. The reactants were stirred at room temperature for 36 hours followed by heating at 50° C. for 6 hours. The grafted polymer was isolated from hexane.

EXAMPLE 6

Emulsion Polymerization of Fluoro Monomers in the Presence of Carbon Nanotubes

In a glass reactor, 0.3 g. of Zonyl™, 5.7 g. styrene, 0.15 g. trimethyl tetradecyl ammonium bromide, 0.05 g. 2,2'-azobis 2-methyl propionamide dihydrochloride, and 10 g. of pre-formed carbon nanotube dispersed in 30 g. water were charged. The glass reactor was sealed and placed on a pre-heated water bath shaker set at 150° F. The polymerization was carried out for 5 hours.

EXAMPLE 7

Aluminum panels were coated with the polymer described in Example 4. The mechanical properties were evaluated by conical mandrel, pencil hardness, cross hatch adhesion, reverse impact, direct impact, 100 methyl ethyl ketone rubs, and 60 degree gloss. A coated panel was placed in a QUV accelerated weather chamber for seven days, and then tested again.

Centrifugal ice adhesion testing was carried out on sample 7 and compared to uncoated aluminum. The adhesion force was 0.31±0.06 MPa for bare aluminum and 0.25±0.03 for sample 7, indicating an ice reduction factor of 1.24.

TABLE 2

| Coating | Contact Angle | Pencil Hardness | Conical Madrel | Cross Hatch Adhesion | Reverse Impact (in/lbs) | Direct Impact (in/lbs) | MEK rubs | 60 degree gloss |
|---|---|---|---|---|---|---|---|---|
| Before | 116 | 3H | Pass | Pass | Pass, 80 | Pass, 80 | Pass, 100 | 68.6 |

TABLE 2-continued

| Coating | Contact Angle | Pencil Hardness | Conical Madrel | Cross Hatch Adhesion | Reverse Impact (in/lbs) | Direct Impact (in/lbs) | MEK rubs | 60 degree gloss |
|---|---|---|---|---|---|---|---|---|
| After QUV | 103 | 2H | Pass | Pass | Pass, 80 | Pass, 80 | Pass, 100 | 72.4 |

EXAMPLE 8

A coating was formed in accordance with the present invention by dispersing multiwalled carbon nanotubes (MC-MWNT, MER Inc) at a loading of about 4 wt % into the coating composition of Example 4. The resulting coating was applied by spraying onto glass slides. The sheet resistance of this sample as determined by 4-point probe measurements was about 1000 ohms/square. The performance of this coating as a resistive heater was tested as described previously.

Resistive heating was achieved by passing a direct electrical current through each sample to generate heat from electrical resistance. Probes (copper wires attached to the samples with silver paint) were attached to each sample at an equidistance from the sample center line. Probes attached to the samples were connected to a potentiostat to pass current through the samples with a maximum output of 10 V. The potentiostat was used in the galvanostat mode to pass constant current through each sample. The changes in voltage over time were recorded for constant currents. Sample temperature was recorded by an IR thermometer placed one inch above the center of the sample surface.

By controlling the current to about 25-30 mA, the surface of the coating increased in temperature from ambient temperature (~70° F.) to about 92° F. in a short period of time (<10 minutes).

The resistive heating rates for the coating can be controlled by with the application of varying current levels. Depending on the nature of the coating polymer and the loading of carbon nanotubes, different sheet resistance, and current carrying capacity can be achieved by the network. In order to maintain coating performance it is important not to exceed the breakdown voltage/current of the composite. For systems with moderate conductivity, low voltage resistive heating in a pulsed or continuous mode may be desirable. As can be seen, the conductive coating of this embodiment of the present invention can be heated using resistive heating at temperatures sufficient to prevent the formation of ice. When rapid melting of existing ice is required, this coating may be combined with that as described in Example 1, subject to the current/voltage considerations. For example, this conductive composite coating may be applied in areas where it may be difficult to apply alternative embodiments, or when specific mechanical, physical properties may be desired, such as bonding and repairing joints and surfaces.

Having described the invention in detail and by reference to preferred embodiments thereof, it will be apparent that modifications and variations are possible without departing from the scope of the invention.

The invention claimed is:

1. An electrically conductive coating composition dispersed in a liquid carrier for use on substrates comprising a nanomaterial selected from carbon nanotubes, metal nanorods, functionalized metal nanoparticles, and a nanostructure comprising carbon nanotubes or fullerenes grafted to a polymer containing an active functional group; said conductive coating composition forming a film when applied to a substrate, which film is resistively heatable to prevent the formation of ice on, or to melt ice from, the surface of said substrate.

2. The electrically conductive coating composition of claim 1 wherein said nanomaterial comprises said nanostructure comprising carbon nanotubes or fullerenes grafted to a polymer containing an active functional group, said polymer selected to render the surface of said substrate icephobic.

3. The electrically conductive coating composition of claim 2 wherein said coating exhibits an ice adhesion reduction factor greater than 1.

4. The electrically conductive coating composition of claim 1 wherein said active functional group is selected from methylene, amine, amide, and carboxyl.

5. The electrically conductive coating composition of claim 1 wherein said nanomaterial comprises carbon nanotubes selected from single-walled carbon nanotubes, multi-walled carbon nanotubes, and mixtures of single-walled and multi-walled nanotubes.

6. The electrically conductive coating composition of claim 1 wherein said polymer is selected from a fluoropolymer or a silicone.

7. The coating composition of claim 1 wherein said polymer comprises polydimethyl siloxane.

8. The electrically conductive coating composition of claim 2 wherein a film of said composition has a sheet resistance of between about 10 and 1000 ohms/square.

9. The electrically conductive coating composition of claim 2 wherein said nanomaterial comprises a nanostructure which comprises from about 20 to about 99% by weight of said polymer and from about 0.02 to about 50 wt % of said carbon nanotubes or fullerenes.

10. The electrically conductive coating composition of claim 1 wherein said liquid carrier comprises a solvent selected from alcohols, ethers, ketones, esters, water, halogenated solvents, solvents, aromatic solvents, and mixtures thereof.

11. The conductive coating composition of claim 10 comprising from about 0.001 to about 5% by weight of said nanomaterial and from about 85 to about 99 wt % of said solvent.

12. The conductive coating composition of claim 1 wherein said functionalized metal nanoparticles comprise metal nanoparticles which have been bound together by self-assembly or which have been grafted with polymerizable or condensable monomer groups.

13. A substrate having a resistively heatable film thereon, said film comprising an electrically conductive coating composition comprising a nanomaterial selected from carbon nanotubes, metal nanorods, and functionalized metal nanoparticles, and a nanostructure comprising carbon nanotubes or fullerenes grafted to a polymer containing an active functional group, said film having a sheet resistance of from about 0.01 to about 1000 ohm/sq.

14. The substrate of claim 13 wherein said film has a thickness of from about 0.05 µm to about 1,000 µm.

15. The substrate of claim 13 further including a primer coating on said substrate; wherein said film overlies said primer coating.

16. The substrate of claim 13 further including a thermally conductive top coating over said film selected from polyurethane, epoxy, polycarbonate and siloxane.

17. The substrate of claim 16 wherein said thermally conductive top coating is formed from a nanostructure comprising carbon nanotubes or fullerenes grafted to a polymer containing at least one active functional group.

18. The substrate of claim 13 further including a thermal barrier coating thereon.

19. The substrate of claim 13 wherein said film includes at least two conductive leads embedded therein.

20. The substrate of claim 13 comprising metal, glass, polymers, elastomers, ceramic, aluminum composites, and carbon fiber composites.

21. The substrate of claim 13 wherein said electrically conductive coating composition includes a hydrophobic polymer therein.

22. A substrate having a multilayer coating thereon which is resistively heatable to prevent the formation of ice or to melt ice on the surface of said substrate comprising:
   a base substrate having first and second major surfaces;
   a primer coating layer on said first major surface of said substrate;
   an electrically conductive film layer on said primer coating, said conductive film layer formed from a nanomaterial selected from carbon nanotubes, metal nanorods, and functionalized metal nanoparticles; and
   a thermally conductive topcoat on said conductive film layer.

23. The substrate of claim 22 including a thermal barrier layer between said primer layer and said conductive film layer.

24. The substrate of claim 22 wherein said thermally conductive topcoat comprises a coating composition comprising a nanostructure comprising carbon nanotubes or fullerenes grafted to a polymer containing an active functional group, said polymer having hydrophobic properties.

25. The substrate of claim 13 wherein said nanomaterial comprises a nanostructure comprising carbon nanotubes or fullerenes grafted to a polymer containing an active functional group; and wherein water droplets applied to the surface of said coating composition exhibit a contact angle on said substrate of at least 80 degrees.

26. The substrate of claim 25 wherein water droplets applied to the surface of said coating composition exhibit a contact angle of at least 100 degrees.

27. The substrate of claim 25 wherein said polymer is a hydrophobic polymer containing at least one active methylene group.

28. The substrate of claim 27 wherein said polymer comprises polydimethyl siloxane.

29. A method of preventing the formation of ice on, or melting ice from, the surface of a substrate comprising:
   applying an electrically conductive coating composition to a substrate surface to form a film thereon, said coating composition comprising a nanomaterial selected from carbon nanotubes, metal nanorods, functionalized metal nanoparticles; and optionally, a polymer; and
   resistively heating said conductive coating composition.

30. The method of claim 29 wherein resistively heating said coating comprises applying voltage to said film between about 5 and about 240 V.

31. The method of claim 29 including heating said film to a temperature of between about 20° C. and about 400° C.

32. The method of claim 29 including heating said film to a temperature of between about 40° C. and about 180° C.

* * * * *

UNITED STATES PATENT AND TRADEMARK OFFICE
CERTIFICATE OF CORRECTION

Page 1 of 2

PATENT NO. : 8,581,158 B2
APPLICATION NO. : 12/375973
DATED : November 12, 2013
INVENTOR(S) : Amy M. Heintz It is certified that error appears in the above-identified patent and that said Letters Patent is hereby corrected as shown below:

In the Specification

Col. 3, Line 33, "in deicing applications." should read --in de-icing applications.--;

Col. 4, Line 12, "FIG. 1 is a cross-sectional view illustrate one embodiment" should read --FIG. 1 is a cross-sectional view illustrating one embodiment--;

Col. 5, Line 23, "polymer is polydimethyl siloxane derived from acrylate-ter" should read --polymer is polydimethylsiloxane derived from acrylate-ter--;

Col. 7, Line 23, "carrier such as a solvent which solvent evaporates to forms a" should read --carrier such as a solvent which solvent evaporates to form a--;

Col. 7, Line 53, "rosilanes, 2.6disubstituted phenols, and isocyanates. Appro-" should read --rosilanes, 2.6-disubstituted phenols, and isocyanates. Appro- --; and Col. 9, Line 39, "Thermal barrier coatings may also formed from polymeric" should read --Thermal barrier coatings may also be formed from polymeric--;

Col. 9, Line 54, "M85285+36176 and M85285+36375" should read --M85285-I-36176 and M85285-I-36375--;

Col. 12, Table 2, Line 63, "Conical Madrel" should read --Conical Mandrel--;

Col. 13, Table 2-Continued, Line 5, "Conical Madrel" should read --Conical Mandrel--;

Col. 13, Line 13, "invention by dispersing multiwalled carbon nanotubes (MC-" should read --invention by dispersing multi-walled carbon nonotubes (MC- --;

Signed and Sealed this
Twenty-sixth Day of August, 2014

Michelle K. Lee
*Deputy Director of the United States Patent and Trademark Office*

CERTIFICATE OF CORRECTION (continued)
U.S. Pat. No. 8,581,158 B2

Col. 13, Line 37, "by with the application of varying current levels. Depending" should read
--with the application of varying current levels. Depending--; and In the Claims Col. 14, Claim 13, Line 62, "0.01 to about 1000 ohm/sq." should read
--0.01 to about 1000 ohms/sq.--.

UNITED STATES PATENT AND TRADEMARK OFFICE
CERTIFICATE OF CORRECTION

PATENT NO.         : 8,581,158 B2                                           Page 1 of 1
APPLICATION NO.    : 12/375973
DATED              : November 12, 2013
INVENTOR(S)        : Heintz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1321 days.

Signed and Sealed this
Twenty-second Day of September, 2015

Michelle K. Lee
*Director of the United States Patent and Trademark Office*